United States Patent [19]

Dupuy et al.

[11] Patent Number: 5,642,361
[45] Date of Patent: Jun. 24, 1997

[54] MESSAGE TRANSMISSION BY MEANS OF A VARIABLE LENGTH FRAME

[75] Inventors: Pierre Dupuy, Paris; Laurent Cruchant, Rueil Malmaison, both of France

[73] Assignee: Alcatel Mobile Communication France, Paris, France

[21] Appl. No.: 299,648

[22] Filed: Sep. 2, 1994

[30] Foreign Application Priority Data

Sep. 3, 1993 [FR] France ................... 93 10531

[51] Int. Cl.⁶ ........................................... H04L 7/00
[52] U.S. Cl. .................. 370/509; 370/503; 375/358; 375/365; 375/368
[58] Field of Search .......................... 370/82, 94.1, 24, 370/105.1, 99, 509, 503, 507, 514, 350; 375/242, 377, 354, 356, 357, 358, 365, 368

[56] References Cited

U.S. PATENT DOCUMENTS

| | | | |
|---|---|---|---|
| 4,617,658 | 10/1986 | Walters | 370/110.1 |
| 4,644,536 | 2/1987 | Utsumi | 370/105.1 |
| 4,651,319 | 3/1987 | Boulds | 370/105.1 |
| 5,228,033 | 7/1993 | Okouchi | 370/110.1 |
| 5,323,385 | 6/1994 | Jurewicz et al. | 370/99 |
| 5,390,216 | 2/1995 | Bilitza et al. | 370/105.1 |

FOREIGN PATENT DOCUMENTS

| | | |
|---|---|---|
| 0197545A2 | 10/1986 | European Pat. Off. . |
| 0534612A2 | 3/1993 | European Pat. Off. . |
| 1077333 | 3/1989 | Japan . |
| 2043837 | 2/1990 | Japan . |

Primary Examiner—Wellington Chin
Assistant Examiner—Jean B. Corrielus
Attorney, Agent, or Firm—Sughrue, Mion, Zinn, Macpeak & Seas

[57] ABSTRACT

A transmitter transmits blocks to a receiver by means of frames formed of a locking row and data rows. It receives an acknowledgement from the receiver sent by the latter on recognizing a locking row. A block comprises control bits, data bits and adaptation bits. During a first phase preceding reception of the acknowledgement the transmitter transmits blocks in which the adaptation bits have been eliminated by means of short frames comprising an initial number of data rows. During a second phase following on from reception of the acknowledgement it transmits blocks incorporating the adaptation bits by means of complete frames comprising a final number of data rows which is greater than said initial number. The receiver includes an analyzer for determining if the blocks are conveyed by a short frame or by a complete frame in order to identify the nature of the blocks.

7 Claims, 3 Drawing Sheets

| | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 1 | C1 | C2 | C3 | C4 | S1 | S2 | S3 |
| 3 | 1 | d1 | d2 | d3 | d4 | d5 | d6 | d7 |
| 4 | 1 | d8 | d9 | d10 | d11 | d12 | d13 | d14 |
| 5 | 1 | d15 | d16 | d17 | d18 | d19 | d20 | d21 |
| 6 | 1 | d22 | d23 | d24 | d25 | d26 | d27 | d28 |
| 7 | 1 | d29 | d30 | d31 | d32 | d33 | d34 | d35 |
| 8 | 1 | d36 | d37 | d38 | d39 | d40 | d41 | d42 |
| 9 | 1 | d43 | d44 | d45 | d46 | d47 | d48 | d49 |
| 10 | 1 | d50 | d51 | d52 | d53 | d54 | d55 | d56 |
| 11 | 1 | d57 | d58 | d59 | d60 | d61 | d62 | d63 |
| 12 | 1 | d64 | d65 | d66 | d67 | d68 | d69 | d70 |
| 13 | 1 | d71 | d72 | d73 | d74 | d75 | d76 | d77 |
| 14 | 1 | d78 | d79 | d80 | d81 | d82 | d83 | d84 |
| 15 | 1 | d85 | d86 | d87 | d88 | d89 | d90 | d91 |
| 16 | 1 | d92 | d93 | d94 | d95 | d96 | d97 | d98 |
| 17 | 1 | d99 | d100 | d101 | d102 | d103 | d104 | d105 |
| 18 | 1 | d106 | d107 | d108 | d109 | d110 | d111 | d112 |
| 19 | 1 | d113 | d114 | d115 | d116 | d117 | d118 | d119 |
| 20 | 1 | d120 | d121 | d122 | d123 | d124 | d125 | S4 |

FIG. 1  PRIOR ART

| Octet n° | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | D1 | D2 | D3 | D4 | D5 | D6 | D7 |
| 5 | D8 | D9 | D10 | D11 | D12 | D13 | D14 | D15 |
| 6 | 1 | D16 | D17 | D18 | D19 | D20 | D21 | D22 |
| 7 | D23 | D24 | D25 | D26 | D27 | D28 | D29 | D30 |
| 8 | 1 | D31 | D32 | D33 | D34 | D35 | D36 | D37 |
| 9 | D38 | D39 | D40 | D41 | D42 | D43 | D44 | D45 |
| 10 | 1 | D46 | D47 | D48 | D49 | D50 | D51 | D52 |
| 11 | D53 | D54 | D55 | D56 | D57 | D58 | D59 | D60 |
| 12 | 1 | D61 | D62 | D63 | D64 | D65 | D66 | D67 |
| 13 | D68 | D69 | D70 | D71 | D72 | D73 | D74 | D75 |
| 14 | 1 | D76 | D77 | D78 | D79 | D80 | D81 | D82 |
| 15 | D83 | D84 | D85 | D86 | D87 | D88 | D89 | D90 |
| 16 | 1 | D91 | D92 | D93 | D94 | D95 | D96 | D97 |
| 17 | D98 | D99 | D100 | D101 | D102 | D103 | D104 | D105 |
| 18 | 1 | D106 | D107 | D108 | D109 | D110 | D111 | D112 |
| 19 | D113 | D114 | D115 | D116 | D117 | D118 | D119 | D120 |
| 20 | 1 | D121 | D122 | D123 | D124 | D125 | D126 | D127 |
| 21 | D128 | D129 | D130 | D131 | D132 | D133 | D134 | D135 |
| 22 | 1 | D136 | D137 | D138 | D139 | D140 | D141 | D142 |
| 23 | D143 | D144 | D145 | D146 | D147 | D148 | D149 | D150 |
| 24 | 1 | D151 | D152 | 153 | D154 | D155 | D156 | D157 |
| 25 | D158 | D159 | D160 | D161 | D162 | D163 | D164 | D165 |
| 26 | 1 | D166 | D167 | D168 | D169 | D170 | D171 | D172 |
| 27 | D173 | D174 | D175 | D176 | D177 | D178 | D179 | D180 |
| 28 | 1 | D181 | D182 | D183 | D184 | D185 | D186 | D187 |
| 29 | D188 | D189 | D190 | D191 | D192 | D193 | D194 | D195 |
| 30 | 1 | D196 | D197 | D198 | D199 | D200 | D201 | D202 |
| 31 | D203 | D204 | D205 | D206 | D207 | D208 | D209 | D210 |
| 32 | 1 | D211 | D212 | D213 | D214 | D215 | D216 | D217 |
| 33 | D218 | D219 | D220 | D221 | D222 | D223 | D224 | D225 |
| 34 | 1 | D226 | D227 | D228 | D229 | D230 | D231 | D232 |
| 35 | D233 | D234 | D235 | D236 | D237 | D238 | D239 | D240 |
| 36 | 1 | D241 | D242 | D243 | D244 | D245 | D246 | D247 |
| 37 | D248 | D249 | D250 | D251 | D252 | D253 | D254 | D255 |
| 38 | 1 | D256 | D257 | D258 | D259 | D260 | D261 | D262 |
| 39 | D263 | D264 | C16 | S1 | S2 | S3 | S4 | S5 |

FIG. 2A

|    | 1 | 2    | 3    | 4    | 5    | 6    | 7    | 8    |
|----|---|------|------|------|------|------|------|------|
| 1  | 0 | 0    | 0    | 0    | 0    | 0    | 0    | 0    |
| 2  | 1 | C1   | C2   | C3   | C4   | S1   | S2   | S3   |
| 3  | 1 | d1   | d2   | d3   | d4   | d5   | d6   | d7   |
| 4  | 1 | d8   | d9   | d10  | d11  | d12  | d13  | d14  |
| 5  | 1 | d15  | d16  | d17  | d18  | d19  | d20  | d21  |
| 6  | 1 | d22  | d23  | d24  | d25  | d26  | d27  | d28  |
| 7  | 1 | d29  | d30  | d31  | d32  | d33  | d34  | d35  |
| 8  | 1 | d36  | d37  | d38  | d39  | d40  | d41  | d42  |
| 9  | 1 | d43  | d44  | d45  | d46  | d47  | d48  | d49  |
| 10 | 1 | d50  | d51  | d52  | d53  | d54  | d55  | d56  |
| 11 | 1 | d57  | d58  | d59  | d60  | d61  | d62  | d63  |
| 12 | 1 | d64  | d65  | d66  | d67  | d68  | d69  | d70  |
| 13 | 1 | d71  | d72  | d73  | d74  | d75  | d76  | d77  |
| 14 | 1 | d78  | d79  | d80  | d81  | d82  | d83  | d84  |
| 15 | 1 | d85  | d86  | d87  | d88  | d89  | d90  | d91  |
| 16 | 1 | d92  | d93  | d94  | d95  | d96  | d97  | d98  |
| 17 | 1 | d99  | d100 | d101 | d102 | d103 | d104 | d105 |
| 18 | 1 | d106 | d107 | d108 | d109 | d110 | d111 | d112 |
| 19 | 1 | d113 | d114 | d115 | d116 | d117 | d118 | d119 |
| 20 | 1 | d120 | d121 | d122 | d123 | d124 | d125 | S4   |

FIG. 2B

|    | 1 | 2     | 3     | 4     | 5     | 6     | 7     | 8     |
|----|---|-------|-------|-------|-------|-------|-------|-------|
| 21 | 1 | C5    | C6    | C7    | C8    | C9    | C10   | C11   |
| 22 | 1 | d'1   | d'2   | d'3   | d'4   | d'5   | d'6   | d'7   |
| 23 | 1 | d'8   | d'9   | d'10  | d'11  | d'12  | d'13  | d'14  |
| 24 | 1 | d'15  | d'16  | d'17  | d'18  | d'19  | d'20  | d'21  |
| 25 | 1 | d'22  | d'23  | d'24  | d'25  | d'26  | d'27  | d'28  |
| 26 | 1 | d'29  | d'30  | d'31  | d'32  | d'33  | d'34  | d'35  |
| 27 | 1 | d'36  | d'37  | d'38  | d'39  | d'40  | d'41  | d'42  |
| 28 | 1 | d'43  | d'44  | d'45  | d'46  | d'47  | d'48  | d'49  |
| 29 | 1 | d'50  | d'51  | d'52  | d'53  | d'54  | d'55  | d'56  |
| 30 | 1 | d'57  | d'58  | d'59  | d'60  | d'61  | d'62  | d'63  |
| 31 | 1 | d'64  | d'65  | d'66  | d'67  | d'68  | d'69  | d'70  |
| 32 | 1 | d'71  | d'72  | d'73  | d'74  | d'75  | d'76  | d'77  |
| 33 | 1 | d'78  | d'79  | d'80  | d'81  | d'82  | d'83  | d'84  |
| 34 | 1 | d'85  | d'86  | d'87  | d'88  | d'89  | d'90  | d'91  |
| 35 | 1 | d'92  | d'93  | d'94  | d'95  | d'96  | d'97  | d'98  |
| 36 | 1 | d'99  | d'100 | d'101 | d'102 | d'103 | d'104 | d'105 |
| 37 | 1 | d'106 | d'107 | d'108 | d'109 | d'110 | d'111 | d'112 |
| 38 | 1 | d'113 | d'114 | d'115 | d'116 | d'117 | d'118 | d'119 |
| 39 | 1 | d'112 | d'121 | d'122 | d'123 | d'124 | d'125 | E12   |
| 40 | 1 | C13   | C14   | C15   | C16   | S5    | S'1   | S'2   |

MESSAGE TRANSMISSION BY MEANS OF A VARIABLE LENGTH FRAME

BACKGROUND OF THE INVENTION

Description of the Prior Art

In a system of synchronous communication between data processing equipments one of the most widely used methods for sending messages consists in defining a frame structure characterized by:

a synchronization flag, special coding of the data to be transmitted so that the synchronization flag cannot be recognized in the middle of the data stream transmitted.

One of the best known ways to implement this method is to choose a flag which is a constant stream of P binary zeros followed by a binary 1. The data is then coded simply by inserting a binary 1 each time that a series of (P−1) binary 0 has been transmitted. For example, if the flag is '00001', the message '0010 0000 10' is transmitted in the form: '00001 0010 00100 10'. The six underlined digits represent the synchronization flag and the inserted binary 1 (the spaces are included only to facilitate reading).

This method has a drawback: the time to transmit a message depends on its contents, which is a serious problem if a fixed routing time is required.

The known solution to this problem is to insert a binary 1 every (P−1) data bits transmitted: it is then certain that P consecutive binary zeros will never be encountered and the transmission time is always the same, regardless of the data transmitted. A well-known example of this method is the use of V.110 frames as defined by the CCITT (Comité Consultatif International du Téléphone et du Télégraphe). These frames comprise a flag made up of eight binary zeros followed by a binary 1, a binary 1 being then inserted every seven bits to form a frame of 80 bits, 17 bits used for synchronization and 63 bits for the data.

A frame can be represented by a table with P columns and L rows. The first row, known as the locking row, includes P binary zeros and subsequent rows, known as data rows, each comprise a synchronization bit at binary 1 followed by (P−1) data bits.

The raw data signaling rate is usually defined as the number of bits of the frame transmitted per unit time and is therefore proportional to P.L, where L represents the number of rows of the half-rate frame. The usable data signaling rate is defined as the number of data bits of the frame transmitted during the same unit time and is therefore proportional to (P−1).(L−1). The transmission efficiency is the ratio of the usable data signaling rate to the raw data signaling rate, that is:

$$(P-1).(L-1)/P.L$$

It is thus clear that the efficiency will be proportional to the frame length, i.e. to the product of the number of columns by the number of rows P.L.

This frame structure is used to convey messages between a first equipment or transmitter and a second equipment or receiver. The receiver is activated at a random time with the result that the time to recognize the start of a message, i.e. the locking row, is dependent on the length of the frame; the recognition time is equal to half the duration of a frame, on average.

It is therefore clear that to increase transmission efficiency it is necessary to increase the length of the frame, which has the effect of increasing the recognition time. This is not desirable because the recognition time conditions all of the transmission procedure, including synchronization of the receiver. If the receiver must also send messages to the transmitter, it usually does so only after synchronization has been achieved.

The known solution is to start transmission by sending special synchronization frames. These are very short frames whose function is as follows: the transmitter begins to send these frames and waits for a response from the receiver. As soon as the receiver begins to receive these synchronization frames it sends a normal message as an acknowledgement of the synchronization frame. The transmitter can then start to send long frames, the receiver being ready to receive them with no time-delay.

Apart from being complicated to implement, this method has the drawback that synchronization takes time to establish: the synchronization flag must be transmitted in full, received and interpreted by the receiver before it responds. The transmitter must then switch to normal communication mode, which may not happen immediately if it must simply retransmit messages which reach it synchronized, since in this case it must wait for the next received message before it can retransmit it. For example, if it receives messages at times T, 2T, . . . , nT, arrival of the acknowledgement between T and 2T will impose a wait until 2T before retransmission can start: it is clear that the synchronization recognition time-delay can lead to a much greater time-delay overall.

This solution is therefore unsatisfactory.

An object of the present invention is a frame structure which can convey messages with good transmission efficiency combined with a message recognition time within acceptable limits.

SUMMARY OF THE INVENTION

In one aspect the present invention consists in a transmitter transmitting blocks to a receiver by means of frames formed of a locking row and data rows and receiving an acknowledgement from said receiver sent by the latter on recognizing a locking row, wherein a block comprising control bits, data bits and adaptation bits, during a first phase preceding reception of said acknowledgement it transmits blocks in which said adaptation bits have been eliminated by means of short frames comprising an initial number of data rows and during a second phase following on from reception of said acknowledgement it transmits blocks incorporating said adaptation bits by means of complete frames comprising a final number of data rows which is greater than said initial number.

Also, the data bits being structured into packets, the transmitter transmits one packet per frame during the first phase and two packets per frame at least during the second phase.

Also, some control bits being common to the two packets transmitted during the second phase, they are transmitted once only during this phase.

According to an additional feature of the invention the adaptation bits are control bits of the receiver that the latter cannot use until the second phase.

These adaptation bits advantageously comprise time alignment data.

Alternatively, these adaptation bits represent the less important bits of a packet whereas the data bits represent the more important bits of the packet.

The invention also concerns a receiver adapted to receive blocks sent by a transmitter as defined hereinabove, said receiver comprising analysis means for determining if said blocks are supported by a short frame or by a complete frame in order to identify the nature of said blocks.

The invention will now be explained in more detail through the following description of one embodiment of the invention which is given by way of example only and with reference to the appended drawings.

BRIEF DESCRIPTION OF THE DRAWINGS

FIG. 1 shows a typical prior art frame.

FIG. 2, which is divided into two parts 2A and 2B for reasons of clarity, shows a typical frame in accordance with the invention.

DETAILED DESCRIPTION OF THE PREFERRED EMBODIMENT

One embodiment of the invention will now be described in connection with the GSM mobile radio system in which the problem as stated arises with particular relevance in the case of half-rate speech transmission.

In this system full-rate coded speech (at 13 kbit/s) must be transcoded before it is subsequently used, for example in the public switched telephone network. A transcoder is therefore provided which receives the coded speech packets from a base transceiver station at the rate of one every 20 milliseconds.

According to GSM Recommendation 08.60, version 3.1.1, these packets of 264 data bits are conveyed in frames of 16 columns and 20 rows, as shown in FIG. 1. These rows are formed of 16 bits (2 octets) and to simplify the description one octet is shown per row in the figure, so that one row of the frame occupies two consecutive rows in the figure.

The first row is the locking row and comprises 16 bits at binary zero. Each of the subsequent rows is a data row and begins with a header bit at binary 1. The first data row comprises 15 control bits C1 through C15. Data rows 2 through 18 each comprise 15 data bits D1 through D15, D16 through D30, . . . , D241 through D255. The 19th and last data row comprises data bits D256 through D264 followed by a control bit C16 and spare bits S1 through S5.

The GSM standards also cater for half-rate coding of speech (at approximately 6.5 kbit/s) and it is assumed that in this case a coded speech packet comprises 125 data bits d1 through d125.

An obvious option is to multiplex two half-rate coded packets to convey them using the frame structure used for a full-rate packet, with the aim of economizing the transmission links between the base transceiver station and the transcoder.

A definition will now be given of a half-rate frame whose length is half that of the full-rate frame.

Each half-rate frame includes eight columns and 20 rows, the first row is the locking row and comprises eight zeros and each of the 19 subsequent data rows begins with a header bit at binary 1. The locking row and the header bits represent the synchronization bits, of which there are 27. It is assumed that the control bits C1 through C16 needed for full-rate transmission are also needed for half-rate transmission. It follows that there remain only 117 bits rather than 125 for routing a half-rate packet.

The transmission efficiency must therefore be increased. To this end a new frame structure is defined whose length is twice that of the half-rate frame and this is used to convey two half-rate packets.

It is further assumed that the control bits C1 through C16 are common to the two packets, with the result that they must appear once only in the new frame.

Referring to FIG. 2, the new frame comprises eight columns and 40 rows. The first or locking row comprises eight bits at binary zero. All the data rows begin with a header bit at binary 1. The first data row comprises the first four control bits C1 through C4 and the first three spare bits S1 through S3. The data bits d1 through d125 of a half-rate packet are placed in data rows 2 through 19 and the 19th row is completed by the fourth spare bit S4. The 20th data row is used for control bits C5 through C11. Data bits d'1 through d'125 of a second half-rate packet are placed in data rows 21 through 38 and the 38th row is completed with the 12th control bit C12. The last data row comprises the last control bits C13 through C16, the last spare bit S5 and two extra spare bits S'1, S'2.

This new frame therefore enables multiplexing of two half-rate packets in a format compatible with that of a full-rate packet. However, its duration is twice that of a full-rate frame with the result that the time to recognize a locking row in the transcoder is increased accordingly, as already explained.

The invention proposes to remedy this drawback as follows, given that only the first four control bits C1 through C4 are needed to start the transcoder. These bits specify the nature of the packet of data bits in the frame, for example half-rate or full-rate.

The base transceiver station (i.e. the transmitter) initially transmits short frames including only the first 20 rows of the new frame as shown in FIG. 2.

This short frame conforms to the required data signaling rate as it conveys a half-rate packet in its entirety. The transcoder (i.e. the receiver) looks for the locking row as soon as it is activated. When it recognizes this row it can identify the control bits C1 through C4 which tell it the nature of the processing to be carried out. The receiver can then send an acknowledgement to the transmitter to tell it that it has synchronized to the short frame. For example, this acknowledgement can comprise a sequence of frames of the same type as that transmitted by the transmitter, especially if the base transceiver station/transcoder link is bidirectional.

Thereafter, upon receiving this acknowledgment, the transmitter produces not short frames but complete frames as shown in FIG. 2.

The receiver includes analyzer means for analyzing the contents of the 20th row after a locking row.

If this row comprises only bits at binary zero, then the frame is a short frame.

If this row includes at least one bit at binary 1, then this must represent either the continuation of a short frame or the second half of a new frame as defined above.

In this case the control bits C5 through C11 occupy locations on this row from the second to the eighth.

For example, they represent a time alignment reference which the transcoder must adopt to send its own frames to the base transceiver station. Note that the transcoder does not need this data while it is not synchronized, i.e. before it has recognized the locking row.

Consideration must also be given to the handover procedure. In this case the transcoder which was receiving frames from a first base transceiver station is obliged to receive frames from a second base transceiver station on the same channel, with the result that it may not have achieved synchronization to the second base transceiver station and continue to send its own frames to the latter. The second base transceiver station could then interpret this transmission as an acknowledgement. To this end, the transcoder sends data specifying that it is no longer synchronized to a complete frame, for example by means of a specific bit. It is to be understood that the use of the term "acknowledgement" in this context is to be interpreted in the broadest possible sense.

The method has been described by means of a concrete example in order to facilitate an understanding of the invention.

It applies to the most varied situations of transmitting a block of data between a transmitter and a receiver provided that the block comprises adaptation bits which are not strictly necessary at the start of transmission.

In the above example these adaptation bits include the control bits C5 through C11 which specify a time alignment reference.

Many other situations are feasible, in particular the form of speech coding used in the GSM system.

This form of coding produces a block of bits in which some bits are more important than others, which are of secondary importance because they are used to transmit nuances. It is tolerable if these less important bits are not transmitted at the start of transmission, i.e. if they are used as adaptation bits.

This concept of more important and less important bits is obviously not limited to the situation of speech transmission.

Further, the person skilled in the art will realize that the invention applies regardless of the relationship between the short frame and the complete frame, provided that this relationship is a specific relationship and known to the receiver. A complete frame twice the length of the short frame has been chosen in the example as described purely for reasons of simplicity.

There is claimed:

1. A transmitter transmitting blocks to a receiver by means of frames formed of a locking row and data rows and receiving an acknowledgement from said receiver sent by the receiver on recognizing a locking row, wherein each of said blocks comprises control bits, data bits and optionally adaptation bits, said transmitter being characterized in that, during a first phase preceding reception of said acknowledgement it transmits blocks by means of short frames containing no adaptation bits and comprising an initial number of data rows, and during a second phase following reception of said acknowledgement it transmits blocks by means of complete frames incorporating said adaptation bits and comprising a final number of data rows which is greater than said initial number.

2. A transmitter according to claim 1 wherein said data bits are structured in packets and it transmits a packet per frame during said first phase and two packets per frame at least during said second phase.

3. A transmitter according to claim 2 wherein some of said control bits are common to said two packets transmitted during said second phase and are transmitted once only during said second phase.

4. A transmitter according to claim 1 wherein said adaptation bits are control bits of said receiver that the latter can use only during said second phase.

5. A transmitter according to claim 4 wherein said adaptation bits comprise time alignment data.

6. A transmitter according to claim 2 wherein said adaptation bits represent less important bits of a packet and said data bits represent more important bits of said packet.

7. A receiver adapted to receive blocks transmitted by a transmitter transmitting blocks to a receiver by means of frames formed of a locking row and data rows and receiving an acknowledgement from said receiver sent by the receiver on recognizing a locking row, wherein each of said blocks comprises control bits, data bits and optionally adaptation bits, said transmitter being characterized in that, during a first phase preceding reception of said acknowledgement it transmits blocks by means of short frames containing no adaptation bits comprising an initial number of data rows, and during a second phase following reception of said acknowledgement said transmitter transmits blocks by means of complete frames incorporating said adaptation bits and comprising a final number of data rows which is greater than said initial number, said receiver comprising analysis means for determining if said blocks are conveyed by a short frame or by a complete frame in order to identify the nature of said blocks.

* * * * *